United States Patent Office 3,793,323
Patented Feb. 19, 1974

3,793,323
AMINO-SUBSTITUTED BENZO(g)
PTERIDINE-di-N-OXIDES
Florin Seng, Cologne, Kurt Ley, Odenthal-Globusch, and Karl Georg Metzger, Wuppertal-Elberfeld, Germany, assignors to Farbenfabriken Bayer Aktiengesellschaft, Leverkusen, Germany
No Drawing. Filed July 7, 1971, Ser. No. 160,542
Claims priority, application Germany, July 11, 1970,
P 20 34 467.7
Int. Cl. C07d 57/28
U.S. Cl. 260—251.5      14 Claims

ABSTRACT OF THE DISCLOSURE 4-amino - pyrimido - (4,5,b) - quinoxaline - 5,10-dioxides of the formula:

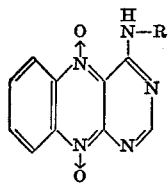

wherein R is hydrogen, a straight or branched chain saturated or partially unsaturated substituted or unsubstituted aliphatic moiety or a substituted or unsubstituted cycloaliphatic moiety, are produced by reacting quinoxaline-di-N-oxide of the formula:

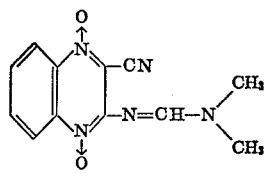

with an amine of the general formula R—NH$_2$, wherein R is as defined, above, in a diluent, at a temperature in the range of 20° to 100° C. These compounds are useful for their antimicrobial activity. They exhibit activity against both gram positive and gram negative bacteria.

---

The present invention is concerned with quinoxaline derivatives, a process for their production, their use as compounds as an active ingredient.

More particularly, the present invention relates to 4-amino - pyrimido - (4,5,b) - quinoxaline - 5,10-dioxides, which are unsubstituted or substituted in the 4-amino moiety. These compounds are useful in both human and veterinary medicine, and are also useful as fodder additives, especially in raising young animals and fatstock.

According to the present invention the 4 - amino-pyrimido-(4,5,b)-quinoxaline-5,10-dioxides may be represented by the Formula I:

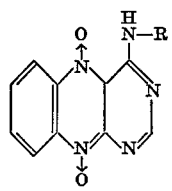

wherein

R is hydrogen, a straight or branched chain saturated or partially unsaturated, substituted or unsubstituted aliphatic moiety or a substituted or unsubstitued cycloaliphatic moiety.

The componds are produced by reacting quinoxaline-di-N-oxide of the Formula II:

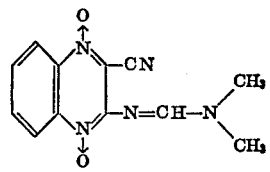

with an amine of the Formula III:

R—NH$_2$      (III)

wherein R is as above defined, in a diluent, at a temperature range of from 20° to 100° C.

When R is an aliphatic moiety, it is preferably straight or branched chain alkyl of 1 to 6 carbon atoms, especially 1 to 4 carbon atoms or lower alkenyl of 2 to 6 carbon atoms, especially 2 to 4 carbon atoms.

When R is a cycloaliphatic moiety, it is preferably of 5 to 7 carbon atoms, especially 5 or 6 carbon atoms. Cycloalkyl of 5 to 7 carbon atoms and particularly 5 or 6 carbon atoms is preferred.

When the aliphatic or cycloaliphatic moiety R is substituted, the preferred substituents are one or more, identical or different, preferably one, hydroxyl, alkoxy and/or dialkylamino moiety, wherein the alkoxy portion is of 1 to 4 carbon atoms and preferably 1 or 2 carbon atoms, and the dialkylamino moiety is of 1 to 4 carbon atoms, preferably 1 or 2 carbon atoms in each alkyl moiety.

Examples of R include methyl, ethyl, n- and iso-propyl, n-, iso- and tert.-butyl, cyclohexyl, allyl, 2-hydroxyethyl, 2-methoxyethyl and 1-dimethylamino-propyl.

At least 1 mol of amine or ammonia (III) is employed per mol of quinoxaline-di-N-oxide (II) in the production of Compounds I, and if desired an excess of amine or ammonia can be used. Preferably 1 to 5, especially 1.5 to 3, mols of amine or ammonia (III) are used per mol of N-oxide (II).

As aliphatic amines (III) there may be used straight or branched chain alkylamines of 1 to 6 carbon atoms, preferably 1 to 4 carbon atoms, or alkenylamines of 2 to 6 carbon atoms, preferably 2 to 4 carbon atoms. The alkylamines and alkenyl-amines are unsubstituted or substituted by one or more, identical or different, preferably one, of the moieties set forth as substituents for the aliphatic and cycloaliphatic moieties above.

The cycloaliphatic amines (III) are of 5 to 7 carbon atoms, preferably 5 to 6 carbon atoms, and are unsubstituted or substituted by one or more, identical or different, preferably one, of the moieties set forth as substituents for the aliphatic and cycloaliphatic moieties above.

Examples of compounds R—NH$_2$ (III) include: methylamine, ethylamine, n- and iso-propylamine, n-, iso- and tert.-butylamine, cyclohexylaimne, allylamine, 2-hydroxyethylamine, 2-methoxyethylamine, 1-dimethylamino-propylamine and ammonia.

Ammonia and the other amines (III) can, where convenient or desired, be employed in the gaseous form, but can also be employed in the form of their aqueous solutions.

The preferred temperature range for the reaction between the Compounds II and III is 40° to 70° C.

Suitable diluents or solvents for the reaction are inert organic solvents, especially polar organic solvents, such as, for example, formamide, dimethylformamide and N-methyl-pyrrolidone; lower aliphatic alcohols with, preferably, 1 to 4 carbon atoms, such as, for example, methanol, ethanol, propanol, isopropanol and n-, iso- and tert.-butanol; lower alkylnitriles, such as, for example, acetonitrile; ethers, such as, for example, dioxane and tetrahydrofuran; and pyridine.

The following reaction scheme, showing the use of methylamine as amine (III), illustrates the reaction according to the invention:

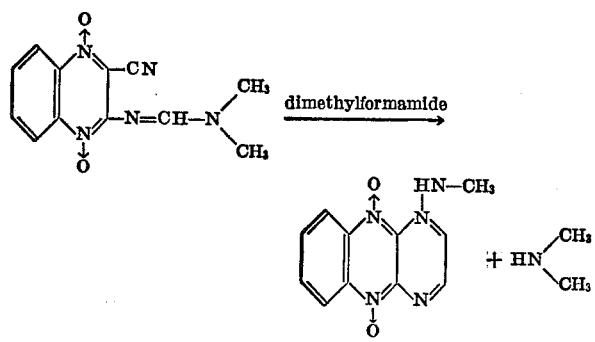

In detail, the reaction according to the invention may be carried out as follows:

The quinoxaline-di-N-oxide (II) is suspended in one of the above-mentioned diluents and is treated with at least the equivalent quantity of a primary amine or ammonia (III). After warming the mixture to between about 20° and about 100° C., the reaction is complete after about 1 to 5 hours. The reaction product separates out as crystals and may be isolated according to customary methods.

The reaction according to the invention produces, smoothly and in good yields, compounds of the Formula I, which, because of their excellent antimicrobial activity, can be employed in human medicine and veterinary medicine and as fodder additives.

The following examples more particularly illustrate the production of the new compounds according to the present invention.

EXAMPLE 1

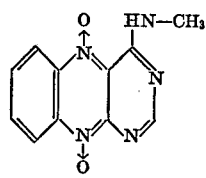

25.7 g. (0.1 mol) of quinoxaline-di-N-oxide (II) are suspended in 80 ml. of dimethylformamide, 17.7 g. (0.2 mol) of 35% strength aqueous methylamine solution are added, and the mixture is warmed to about 50° C. After about one hour it is cooled and the product filtered off. 18 g. (74% of theory) of 4-methylamino-pyrimido-(4,5-b)-quinoxaline-5,10-dioxide are obtained in the form of red crystals which, after recrystallization from dimethylformamide, melt at 189° C., with decomposition.

*Analysis.*—$C_{11}H_9N_5O_2$ (243): Calculated (percent): C, 54.3; H, 3.7; N, 28.8. Found (percent): C, 54.1; H, 3.9; N, 28.9.

The following compounds are prepared by methods analogous to that described above by reacting the quinoxaline-di-N-oxide (II) with the amine listed below.

EXAMPLES 2-8

| | | Reaction | | | |
|---|---|---|---|---|---|
| | | Time (hours) | Temperature (0° C.) | M.P. (0° C.) | Yield (percent of theory) |
| Formula | Amine used | | | | |
| 2 | Ethylamine | 1 | 50 | 170 | 77 |
| 3 | Propylamine | 5 | 50 | ¹166 | 64 |
| 4 | Isopropylamine | 4 | 50 | ¹172 | 74 |
| 5 | n-Butylamine | 3 | 60 | ¹174 | 68 |
| 6 | Cyclohexylamine | 3 | 60 | ¹180 | 59 |

EXAMPLES 2-8—Continued

| Formula | Amine used | Reaction Time (hours) | Temperature (0° C.) | M.P. (0° C.) | Yield (percent of theory) |
|---|---|---|---|---|---|
| 7. (structure with HN—CH₂—CH₂—OH) | Ethanolamine | 1 | 70 | ¹174 | 64 |
| 8. (structure with NH₂) | Ammonia | 8 | 60 | >300 | 88 |

¹ Decomposition.

The di-N-oxide (II) used as starting material is obtained from 2-amino-3-cyano-quinoxaline-di-N-oxide and dimethylformamide in the presence of phosphorus oxychloride, in the following manner.

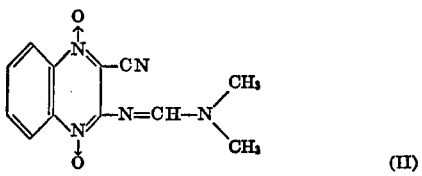

(II)

20.2 g. (0.1 mol) of 2-amino-3-cyanoquinoxaline-di-N-oxide (K. Ley, F. Seng, H. Eholzer, R. Nast and R. Schubart, Angew. Chemie 81, 569 (1969)) are suspended in 100 ml. of dimethylformamide, and 15.3 g. (0.1 mol) of phosphorus oxychloride are added dropwise while stirring and cooling in ice. After the dropwise addition, the mixture is stirred for a further hour and the precipitate is then filtered off. 23 g. (90% of theory) of the Compound II are obtained in the form of red crystals, which after recrystallization from pyridine melt at 231° C., with decomposition.

Analysis.—$C_{12}H_{11}N_5O_2$ (molecular weight 257): Calculated (percent): C, 56.0; H, 4.3; N, 27.3. Found (percent): C, 56.0; H, 4.5; N, 27.6.

The compounds according to the invention are effective against Gram-negative and Gram-positive bacteria. Favorable inhibition values are obtained in the plate test (Table 1) against staphylococci and streptococci which are Gram-positive bacteria, and against enterobacteria (for example Escherichia coli, Proteus and Klebsiella) which are Gram-negative bacteria.

TABLE 1

Minimum inhibitory concentration (MIC) in the plate test

The medium used had the following composition

|   | G. |
|---|---|
| Protease peptone | 10 |
| Veal extract | 10 |
| Dextrose | 2 |
| NaCl | 3.0 |
| Disodium phosphate | 2.0 |
| Sodium acetate | 1.0 |
| Adenine sulphate | 0.01 |
| Guanine hydrochloride | 0.01 |
| Uracil | 0.01 |
| Xanthin | 0.01 |
| Ionagar | 12.0 |

1000 ml. of distilled water.

pH value of the medium:

|   | Minimum inhibitory concentrations in γ/ml. | | | | | | |
|---|---|---|---|---|---|---|---|
| Compound from Example | 7 | 3 | 5 | 2 | 1 | 6 | 4 |
| Bacteria: | | | | | | | |
| Escherichia coli A 261 | 100 | 100 | ---- | 20 | 5 | ---- | 100 |
| Escherichia coli C 165 | 100 | 100 | ---- | 160 | 5 | ---- | 100 |
| Proteus vulgaris | 100 | 100 | ---- | 10 | 5 | ---- | 100 |
| Pseudomonas aeruginosa Bonn | 100 | 150 | ---- | 150 | 50 | ---- | 150 |
| Klebsiella 8085 | 150 | 100 | ---- | 10 | 5 | ---- | ---- |
| Staphylococcus aureus 133 | 100 | 10 | 10 | 5 | 2.5 | 10 | 10 |
| Streptococcus pyogenes W | 10 | 20 | 20 | 20 | 20 | ---- | 20 |

The compounds according to the invention can be used both in human medicine and in veterinary medicine, for prophylaxis as well as for the treatment of infections caused by bacteria, and especially for the treatment of local infections.

In such treatment, the compounds can be employed per se or as the active agent in pharmaceutical compositions, such as, for example, ointments, creams, pastes, powders, lotions, solutions, emulsions and suspensions.

Suitable pharmaceutical compositions are produced by combining the active agent with a pharmaceutically acceptable, non-toxic, inert, solid, semi-solid or liquid excipient, carrier or solvent, such as, for example, paraffins, vegetable fats and oils (for example groundnut and sesame oil), alcohols (for example ethyl alcohol and glycerol), glycols (for example propylene glycol and polyethylene glycol), emulsifiers (for example non-ionic and anionic emulsifiers, such as polyoxyethylene-fatty acidesters, polyoxyethylene-fatty alcohol-ethers, alkylsulphonates and acrylsulphonates), natural and synthetic rock powders (for example kaoline, talc, chalk, highly dispersed silica or silicates), sugar (for example lactose and glucose). These formulations are produced according to techniques per se known. The therapeutically active compounds are preferably present in the compositions in a concentration of about 0.5 to about 90 percent by weight of the total composition. The concentration of the active agent, the nature of the excipient carrier or solvent and the frequency of administration are chosen in accordance with the type and severity of the illness, as is customary particularly in the treatment of local inflammations.

Furthermore, the compounds according to the present invention can be used for disinfection purposes.

The new compounds according to the present invention are particularly suitable for use as fodder additives, for example in raising young animals and fatstock, such as chicks, cattle and pigs. Their addition to the fodder leads to better utilization of the fodder and hence to more rapid growth and more rapid increase in weight of the animals. When added to the fodder, the new compounds also prevent bacterial infections of the animals.

The good effectiveness of the compounds according to the invention as fodder additives can be seen from the chick fattening experiment described below (Table 2).

Chick fattening experiment

The substances, ground with the fodder, were fed to one-day old chicks. The feeding lasted for seven weeks. Table 2 below gives the experimental data for the compound obtainable according to Example 2, for each of the 7 weeks.

TABLE 2

| Compound from example— (amount used is in parentheses) | Week | No. of animals | Total weight increase (in g.) | Ratio of total weight increase/ control (in percent) |
|---|---|---|---|---|
| Control (0 p.p.m.) | 0 | 50 | [1] 40 | 100.0 |
|  | 1 | 50 | 84 | 100.0 |
|  | 2 | 50 | 248 | 100.0 |
|  | 3 | 50 | 429 | 100.0 |
|  | 4 | 50 | 607 | 100.0 |
|  | 5 | 50 | 922 | 100.0 |
|  | 6 | 50 | 1,250 | 100.0 |
|  | 7 | 50 | 1,479 | 100.0 |
| Example 2 (20 p.p.m.) | 0 | 50 | [1] 41 | -------- |
|  | 1 | 50 | 92 | 109.5 |
|  | 2 | 50 | 262 | 105.6 |
|  | 3 | 50 | 466 | 108.6 |
|  | 4 | 50 | 678 | 111.7 |
|  | 5 | 50 | 993 | 107.7 |
|  | 6 | 50 | 1,310 | 104.8 |
|  | 7 | 50 | 1,574 | 106.4 |

[1] Weight of the one-day old chicks.

What is claimed is:

1. A 4 - amino - pyrimido - (4,5,b) - quinoxaline-5,10-dioxide of the formula:

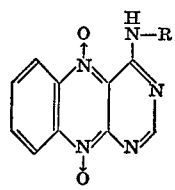

wherein

R is hydrogen, straight or branched chain alkyl of 1 to 6 carbon atoms or cycloalkyl of 5 to 7 carbon atoms, said alkyl and said cycloalkyl being unsubstituted or substituted by one or more identical or different moieties selected from the group consisting of hydroxy and alkoxy of 1 to 4 carbon atoms.

2. A compound according to claim 1, wherein R is hydrogen, methyl, ethyl, n-propyl, iso-propyl, butyl, cyclohexyl or β-hydroxy-ethyl.

3. A compound according to claim 1, wherein R is hydrogen, straight or branched chain alkyl of 1 to 4 carbon atoms, hydroxyl substituted straight or branched chain alkyl of 1 to 4 carbon atoms, or cyclohexyl.

4. The compound according to claim 1, which is

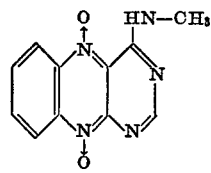

5. The compound according to claim 1, where is

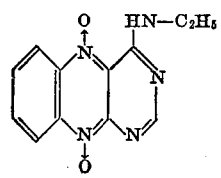

6. The compound according to claim 1, which is

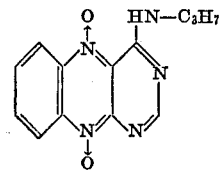

7. The compound according to claim 1, which is

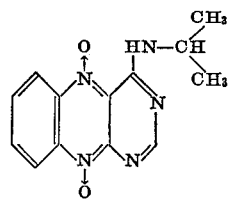

8. The compound according to claim 1, which is

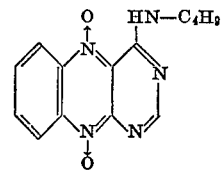

9. The compound according to claim 1, which is

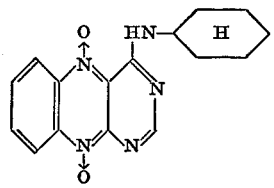

10. The compound according to claim 1, which is

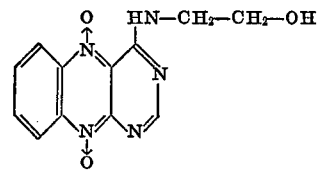

11. The compound according to claim 1, which is

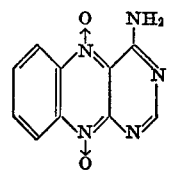

12. A process for the production of a compound of claim 1 which comprises reacting quinoxaline-di-N-oxide of the formula:

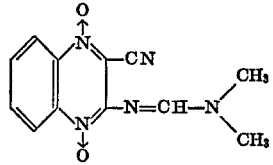

with an amine of the formula R—NH$_2$, wherein

R is hydrogen, straight or branched chain alkyl of 1 to 6 carbon atoms or cycloalkyl of 5 to 7 carbon atoms, said alkyl and said cycloalkyl being unsubstituted or substituted by one or more identical or different moieties selected from the group consisting of hydroxy and alkoxy of 1 to 4-carbon atoms in an inert diluent, at a temperature in the range of from 20° to 100° C.

13. A process according to claim 12, wherein the temperature is from 40 to 70° C.

14. A process according to claim 12, wherein the diluent is a polar organic solvent, a lower aliphatic alcohol, a lower alkylnitrile, an ether, or pyridine.

References Cited

UNITED STATES PATENTS

| | | | |
|---|---|---|---|
| 2,942,001 | 6/1960 | Drvey et al. | 260—250 A |
| 3,642,796 | 2/1972 | Seng et al. | 260—250 A |

NICHOLAS S. RIZZO, Primary Examiner

R. V. RUSH, Assistant Examiner

U.S. Cl. X.R.

260—250 QN; 424—250